US006859926B1

United States Patent
Brenner et al.

(10) Patent No.: US 6,859,926 B1
(45) Date of Patent: Feb. 22, 2005

(54) APPARATUS AND METHOD FOR WORKLOAD MANAGEMENT USING CLASS SHARES AND TIERS

(75) Inventors: Larry Bert Brenner, Austin, TX (US); Luke Matthew Browning, Austin, TX (US); Kenneth Bernard Rozendal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 769 days.

(21) Appl. No.: 09/661,279

(22) Filed: Sep. 14, 2000

(51) Int. Cl.[7] .............................................. G06F 9/46
(52) U.S. Cl. ....................................... 718/100; 718/104
(58) Field of Search ............................... 709/223, 224, 709/225, 226; 718/100, 102, 103, 104

(56) References Cited

U.S. PATENT DOCUMENTS

| | | | | |
|---|---|---|---|---|
| 5,504,894 A | * | 4/1996 | Ferguson et al. ............... 707/2 |
| 5,528,513 A | * | 6/1996 | Vaitzblit et al. ............ 718/103 |
| 5,603,029 A | * | 2/1997 | Aman et al. ................. 709/105 |
| 5,640,595 A | * | 6/1997 | Baugher et al. ............... 710/10 |
| 5,682,530 A | * | 10/1997 | Shimamura ................. 709/104 |
| 5,748,958 A | * | 5/1998 | Badovinatz et al. ........ 709/100 |
| 5,991,793 A | * | 11/1999 | Mukaida et al. ............. 709/104 |
| 6,108,683 A | * | 8/2000 | Kamada et al. .............. 709/103 |
| 6,263,359 B1 | * | 7/2001 | Fong et al. .................. 718/103 |
| 6,304,906 B1 | * | 10/2001 | Bhatti et al. ................. 709/227 |
| 6,341,303 B1 | * | 1/2002 | Rhee et al. .................. 709/104 |
| 6,385,639 B1 | * | 5/2002 | Togawa ....................... 709/200 |
| 6,418,459 B1 | * | 7/2002 | Gulick ........................ 709/104 |
| 6,560,649 B1 | * | 5/2003 | Mullen et al. ............... 709/226 |

* cited by examiner

Primary Examiner—St. John Courtenay, III
Assistant Examiner—George L. Opie
(74) Attorney, Agent, or Firm—Duke W. Yee; Volel Emile; Wayne P. Bailey

(57) ABSTRACT

An apparatus and method for performing workload management is provided. In particular, an apparatus and method for performing workload management using class shares and tiers is provided. In the apparatus and method, each process is associated with a particular class of workload. Each class has an associated number of shares representing the importance of the class relative to other classes. Each class, in turn, is associated with a particular tier of workload importance. Classes of processes compete with other classes of processes in their same tier for system resources based on the number of shares that they have. These shares are representative of the percentage of the system resource the process is provided relative to the other classes in the same tier. Classes in one tier compete with classes in other tiers for system resources based on the priority assigned to the tiers.

14 Claims, 7 Drawing Sheets

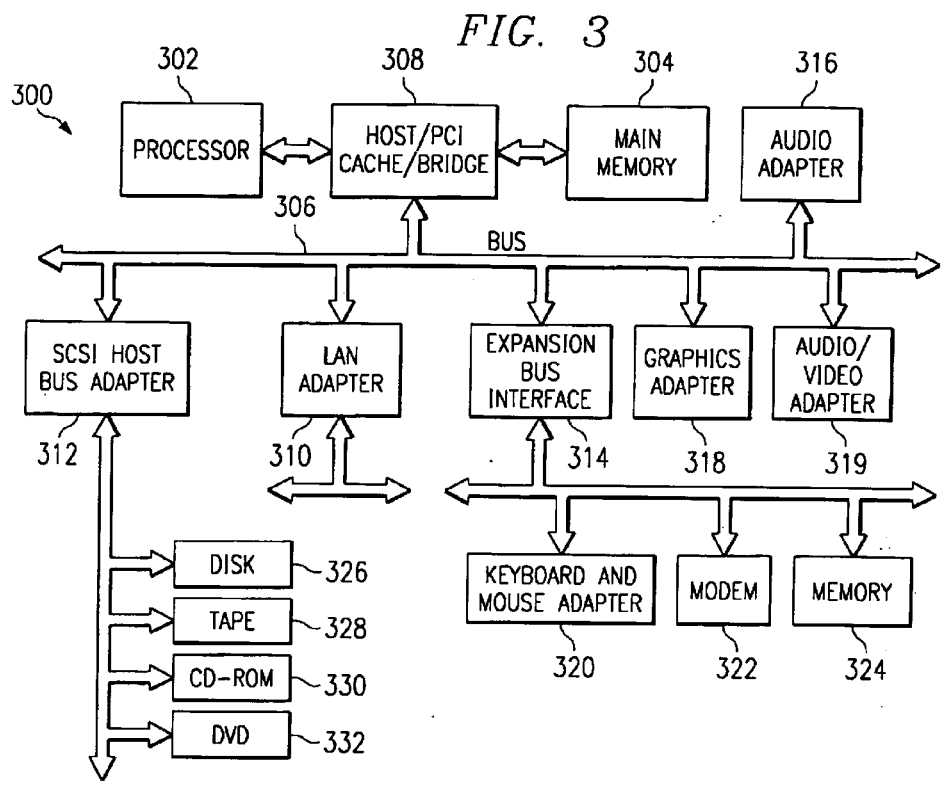
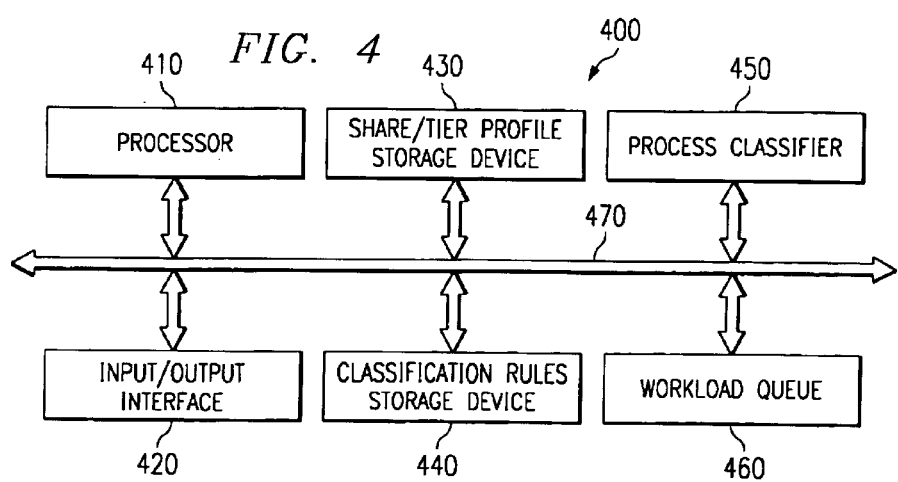

FIG. 5
| class name | user name | group name | application |
|---|---|---|---|
| system | root | - | - |
| support | tech1, tech 2 | - | - |
| marketing | - | - | /bin/analysis |
| skilled | - | webmasters | /bin/emacs |
| promoted | sally | staff | /bin/ksh, /bin/sh |
| games | lbob, lted | lmanagers | /bin/solitaire |
| bad | hacker | - | - |
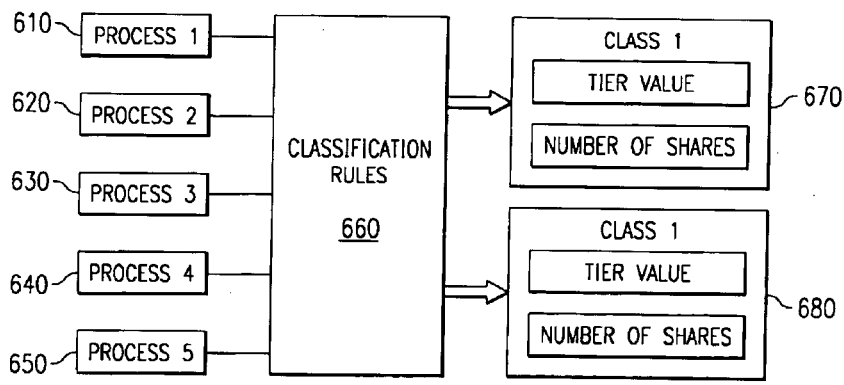
FIG. 6
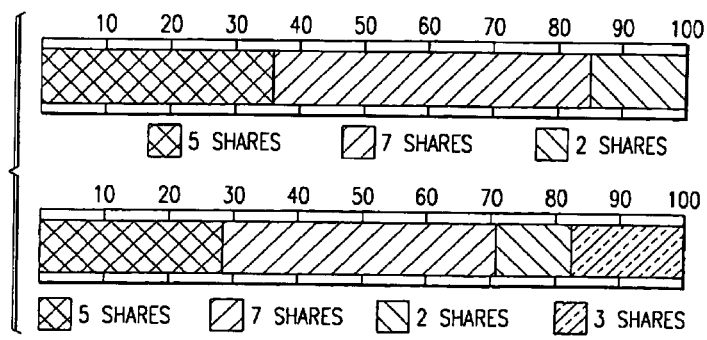
FIG. 8

FIG. 7A

| Class | Description | Tier | CPU | Memory |
|---|---|---|---|---|
| System | | 0 | 47 | 47 |
| Default | | 0 | 0 | 0 |
| sales | | 0 | 0 | 0 |
| support | | 0 | 0 | 0 |
| marketing | | 0 | 0 | 0 |
| skilled | | 0 | 0 | 0 |
| promoted | | 0 | 0 | 0 |
| games | | 4 | 0 | 0 |
| bad | | 9 | 0 | 0 |

Workload Management: localhost
Class   Selected   View   Options   Help — 730
720
710
9 Objects 0 Hidden

FIG. 7B

Create Class

General | Resource Shares | Resource Limits — 780

Class Name: 770   BatchI — 740

Description:   Batch jobsI — 750

Tier:   7I — 760

OK   Apply   Cancel   Help

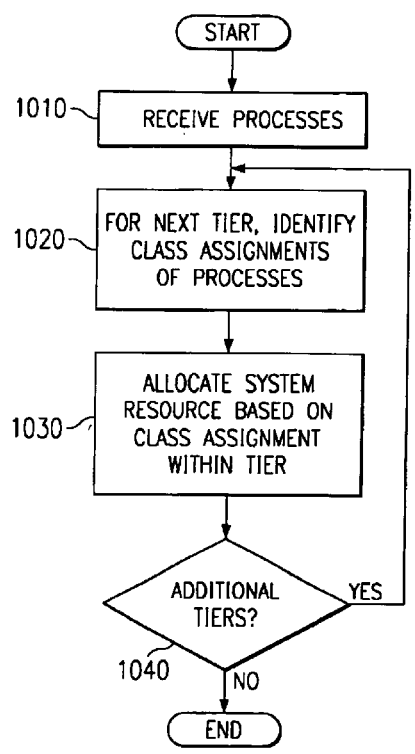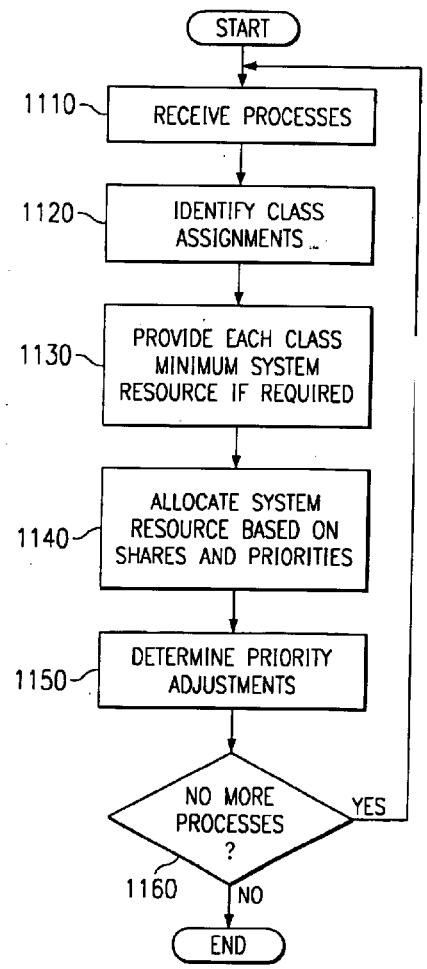

APPARATUS AND METHOD FOR WORKLOAD MANAGEMENT USING CLASS SHARES AND TIERS

BACKGROUND OF THE INVENTION

1. Technical Field

The present invention is directed to an apparatus and method for workload management. In particular, the present invention is directed to an apparatus and method for workload management in which a class share and tier structure is utilized.

2. Description of Related Art

As distributed computing systems become larger, the number of servers in these computing systems increases. As a result, system maintenance becomes an increasingly large source of cost in maintaining the computing system. In an effort to reduce this cost, a computing system may make use of server consolidation wherein workloads from many different server systems (print, database, general user, transaction processing systems, and the like) are combined into a single large system. The drawback to such consolidation is that the workloads from these servers now must compete for system resources such as central processing unit (CPU) time, memory and the like.

In view of the above, it would be beneficial to have an apparatus and method to manage the workload of a computing system, such as a consolidated server system, such that workloads are provided system resources in a manner consistent with the importance of each component workload relative to the other component workloads.

SUMMARY OF THE INVENTION

The present invention provides an apparatus and method for performing workload management. In particular, the present invention provides an apparatus and method for performing workload management using class shares and tiers.

With the present invention, each process is associated with a particular class of workload. Each class has an associated number of shares representing the importance of the class relative to other classes. Each class, in turn, is associated with a particular tier of workload importance.

Classes of processes compete with other classes of processes in their same tier for system resources based on the number of shares that they have. These shares are representative of the percentage of the system resource the processes of each class should be provided relative to the processes of other classes in the same tier.

Classes in one tier compete with classes in other tiers for system resources based on the priority assigned to the tiers. For example, tier 0 is the highest priority tier and tier 9 is the lowest priority tier. Thus, classes in tier 0 will be provided access to system resources before classes in tier 1 are provided access to system resources.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is an exemplary block diagram of a client according to the present invention;

FIG. 4 is an exemplary block diagram of a workload manager in accordance with the present invention;

FIG. 5 is an exemplary block diagram illustrating class rules according to the present invention;

FIG. 6 is an exemplary diagram illustrating an application of classification rules to processes to classify the processes into classes;

FIG. 7A is an exemplary diagram illustrating a main menu graphical user interface in which an administrator may be provided with a listing of the defined classes in accordance with the present invention;

FIG. 7B is an exemplary diagram illustrating a "Create Class" graphical user interface used to define a new class in accordance with the present invention;

FIG. 8 is an exemplary diagram that illustrates the percentage goals of a system resource for a plurality of classes based on shares both before and after an addition of an active class, in accordance with the present invention;

FIG. 10 is a flowchart outlining an exemplary operation of the present invention when performing workload management between classes in different tiers; and FIG. 11 is a flowchart outlining an exemplary operation of the present invention when performing workload management between classes in the same tier.

DETAILED DESCRIPTION OF THE PREFERRED EMBODIMENTS

Figure 1:
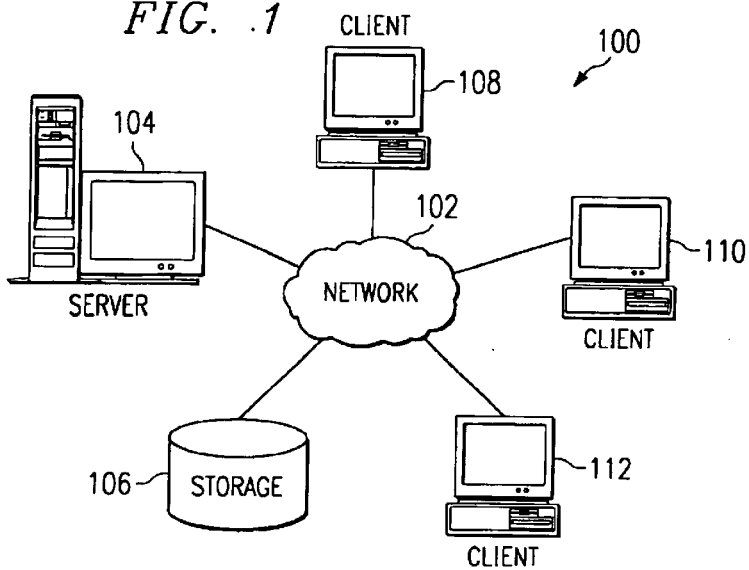
FIG. 1 is a diagram illustrating a distributed data processing system according to the present invention.

With reference now to the figures, and in particular with reference to FIG. 1, a pictorial representation of a distributed data processing system is depicted in which the present invention may be implemented. Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network which receives a program or other application from another computer coupled to the network. In the depicted example, server 104 provides data, such as boot files, operating system images and applications, to clients 108–112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network. FIG. 1 is intended as an example and not as an architectural limitation for the processes of the present invention.

Figure 2:
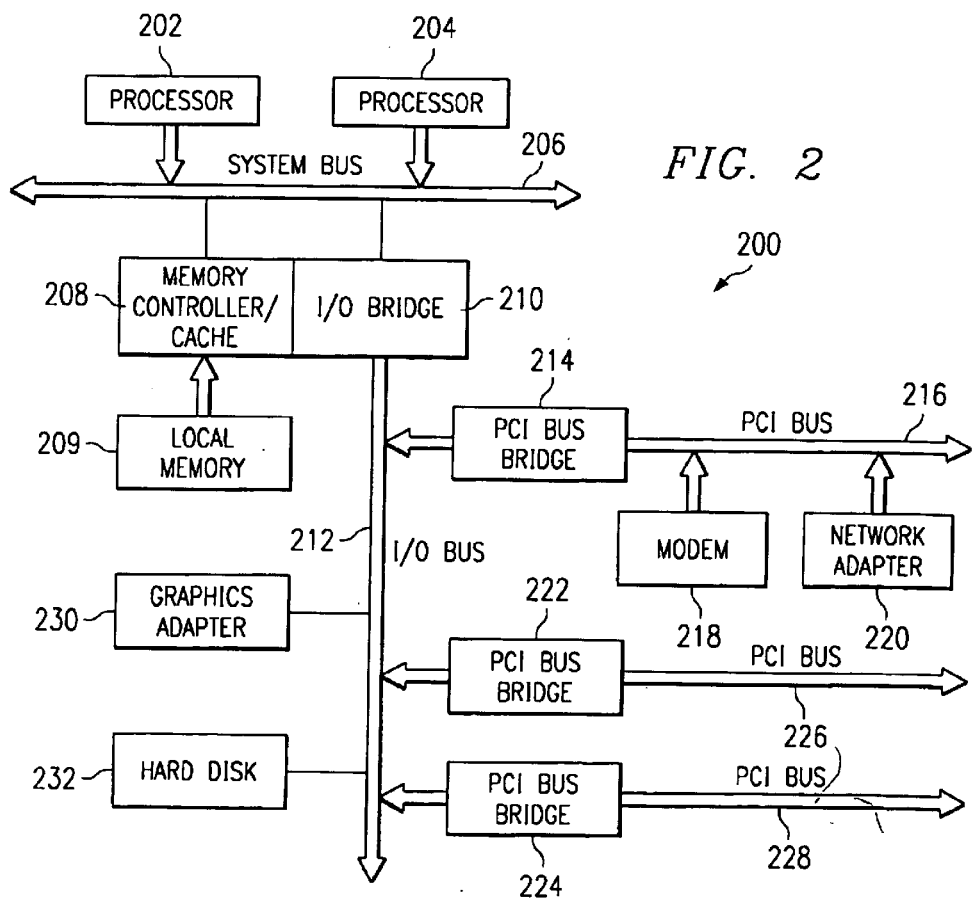
FIG. 2 is an exemplary block diagram of a server according to the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000, a product of International Business Machines Corporation in Armonk, N.Y., running the Advanced Interactive Executive (AIX) operating system.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection.

In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324.

In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation.

An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

The present invention provides an apparatus and method for performing workload management. The apparatus and method make use of classes of processes having associated relative shares. The relative shares provide a measure by which it can be determined what percentage of system resources should be allocated to the processes in the class relative to other processes in other classes.

In addition, the present invention makes use of a set of tiers for defining the relative importance of classes of processes. Tiers range from tier 0 to tier 9, for example, with lower numbered tiers having a higher priority than higher number tiers. Thus, the tier designation provides a measure of importance of a set of classes relative to another set of classes while the shares provide a measure of importance of a class relative to other classes within a tier.

This share and tier architecture is used by a workload manager to determine the percentage of system resources that should be allocated to various processes in a manner to be described more fully hereafter. The workload manager may be, for example, part of a server that consolidates workloads from a plurality of other servers in a distributed data processing system, such as that shown in FIG. 1. For example, the present invention may be implemented on a server, such as server 200, to manage workload submitted by one or more client devices, such as client device 300. Alternatively, the present invention may be implemented in a stand alone data processing system to improve responsiveness of interactive work by reserving physical memory, for example.

FIG. 4 is an exemplary block diagram illustrating a workload manager 400 in accordance with the present invention. The workload manager 400 may be implemented in software, hardware, or a combination of software and hardware. For purposes of the following explanation of the preferred embodiments, the present invention will be described in terms of a workload manager 400 implemented in software executed in hardware.

As shown in FIG. 4, the workload manager 400 includes a processor 410, an input/output interface 420, a share/tier profile storage device 430, a classification rules storage device 440, a process classifier 450, and a workload queue 460. The elements 410–460 are in communication with one another via the control/signal bus 470. While a bus architecture is shown in FIG. 4, other mechanisms for providing a communication pathway between the elements 410–460 may be used without departing from the spirit and scope of the present invention.

Processes are received by the workload manager via the input/output interface 420 and are assigned by the process classifier 450 to a class. The classification is performed based on classification rules established and stored in the classification rules storage device 440. Once classified, the processes are stored in the workload queue 460 for processing based on share/tier profile information stored in the storage device 430. The share/tier profile information identifies the shares for a class and the tier to which the class belongs, along with minimum and maximum resource limits, as will be described more fully hereafter. All of these functions are performed under the control of the processor 410.

Process Classification

Each process has associated attributes which may be used to perform a classification of the process into a defined class. For example, a process may include attributes identifying the user that submitted the process, the group from which the process was submitted, the fully qualified path of the application which the process is executing, and the like. These attributes may be used with established classification rules to determine to which class the process should belong.

The classification rules identify which attributes and the values of those attributes that are to be included in a particular class. For example, the classification rules may be as simple as identifying that class 1 comprises all those processes that have a group attribute having the value of "marketing" or "accounting." Similarly, the classification rules may be more complex such as identifying that all processes having a group attribute of "marketing" and that have a user attribute of "brenner" and a fully qualified path of "bin/analysis" are to be classified in class 2. Based on established classification rules, processes may be classified by determining their attributes and attribute values and applying the classification rules to those attribute values.

Each class has an associated number of system resource shares for each of a plurality of system resources. The default share value for any class is set to 1. However, classes may be assigned system resource shares as integer values ranging, in a preferred embodiment, from 1 to 65,535 for each of a plurality of system resources. Thus, for example, a class may have 5 shares for a printer, 6 shares for memory, and 10 shares for CPU time, or the like. Any type of system resource may be represented using the present invention including hardware and software resources.

The shares are used as a relative measure of the importance of the class relative to other classes within the same tier to which the class is assigned. Thus, a first class may have 6 shares of a system resource and a second class may have 10 shares of that system resource. In this example, the second class has a higher relative importance than the first class and thus, will be provided with a higher percentage of that system resource, whether that be CPU time, printer access time, memory space, or the like.

Each class also has defined resource limits. The resource limits indicate the minimum and maximum amount of a system resource that may be allocated to the class as a percentage of the total system resources. Resource limits will be described in more detail hereafter.

In addition to shares, each class is assigned to a particular tier of workload management. In a preferred embodiment, the tiers are designated as tiers 0–9, with 0 being the highest priority tier and 9 being the lowest priority tier. Of course, any number of tiers and any manner of identifying tiers may be used without departing from the spirit and scope of the present invention.

With the tier system of the present invention, processes in classes assigned to tier 0 will be favored for access to the system resource over processes in classes in tiers 1–9. By favoring these processes, what is meant is that system resources are exclusively assigned to the processes in tier 0 first. Unused or spare system resources are then assigned to the processes in tier 1, and so on. System resources flow down from one tier to another and when resources need to be reclaimed, they are reclaimed in the reverse order.

Class Assignment Rules

For a class to be defined, the class name, tier, resource shares and resource limits must be defined. Once a class has been defined, class assignment rules need to be created. The class assignment rules are used to assign processes to a class based on process attributes.

FIG. 5 is an exemplary diagram illustrating classes and class assignment rules. As shown in FIG. 5, the process attributes utilized in this particular example for classification of processes are user name, group name and application path name.

For example, the class assignment rule for assigning processes into the class "promoted" is that the user name be "sally", the group name be "staff", and the application path be "/bin/ksh" or "/bin/sh." Similarly, for a process to be classified in the "skilled" class, the group name must be "webmasters" and the application path must be "/bin/emacs." Using these class assignment rules, processes are classified into various defined classes. FIG. 6 is a diagram illustrating this procedure. As shown in FIG. 6, classification rules 660 are applied to processes 610–650. Based on the attributes of the processes, e.g., user name, group name, fully qualified path, and the like, these processes meet certain requirements of various ones of the classification rules. As a result, the processes are classified into one of the predefined classes 670 or 680. As a result of the classification, these processes now belong to classes which have an assigned tier value and number of shares which will be used to determine their access to system resources.

Defining Classes and Class Assignment Rules

The class assignment rules may be administrator defined. For example, the administrator may make use of a graphical user interface to create, delete, or modify classes and class assignment rules. FIGS. 7A–7E illustrate exemplary graphical user interfaces for creating new classes and class assignment rules.

FIG. 7A illustrates a main menu graphical user interface in which an administrator may be provided with a listing 710 of the defined classes, a description of the class, an assigned tier, and system resource shares, e.g., CPU time shares and memory shares. In addition, the administrator may select various functions represented as graphical icons 720 or menu functions 730. For example, the administrator may select "New Class" from the "Class" menu.

FIG. 7B illustrates a "Create Class" graphical user interface used to define a new class. As shown in FIG. 7B, the "Create Class" graphical user interface contains fields 740 and 750 for entering a class name and a class description. In addition, a field 760 is provided for assigning the class to a particular tier. The "Create Class" graphical user interface further includes tabs 770 and 780 for accessing other graphical user interfaces for specifying resource shares and resource limits for the class.

Figure 7C:
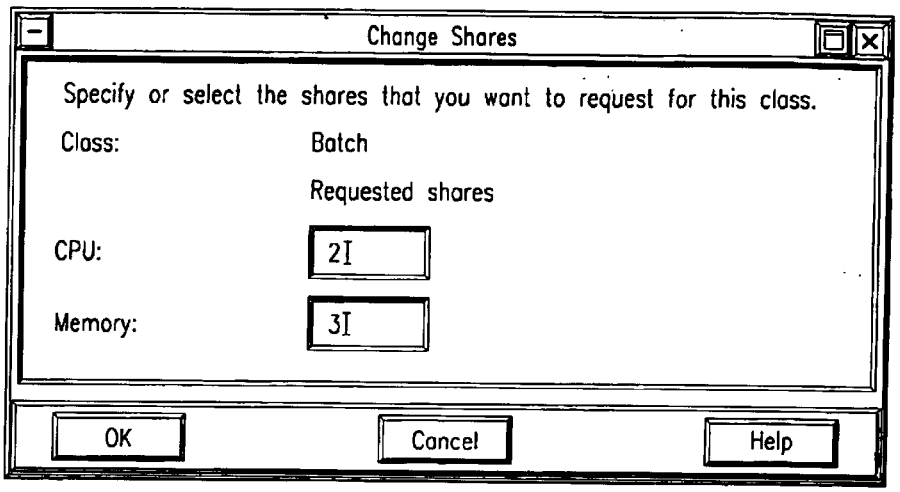
FIG. 7C is an exemplary diagram illustrating a "Change Shares" graphical user interface for designating the shares appropriated to the class for each of a plurality of system resources, in accordance with the present invention.

FIG. 7C illustrates a "Change Shares" graphical user interface for designating the shares appropriated to the class for each of a plurality of system resources. As shown in FIG. 7C, the graphical user interface includes fields for designating the number of shares the class is appropriated for each of the system resources.

Figure 7D:
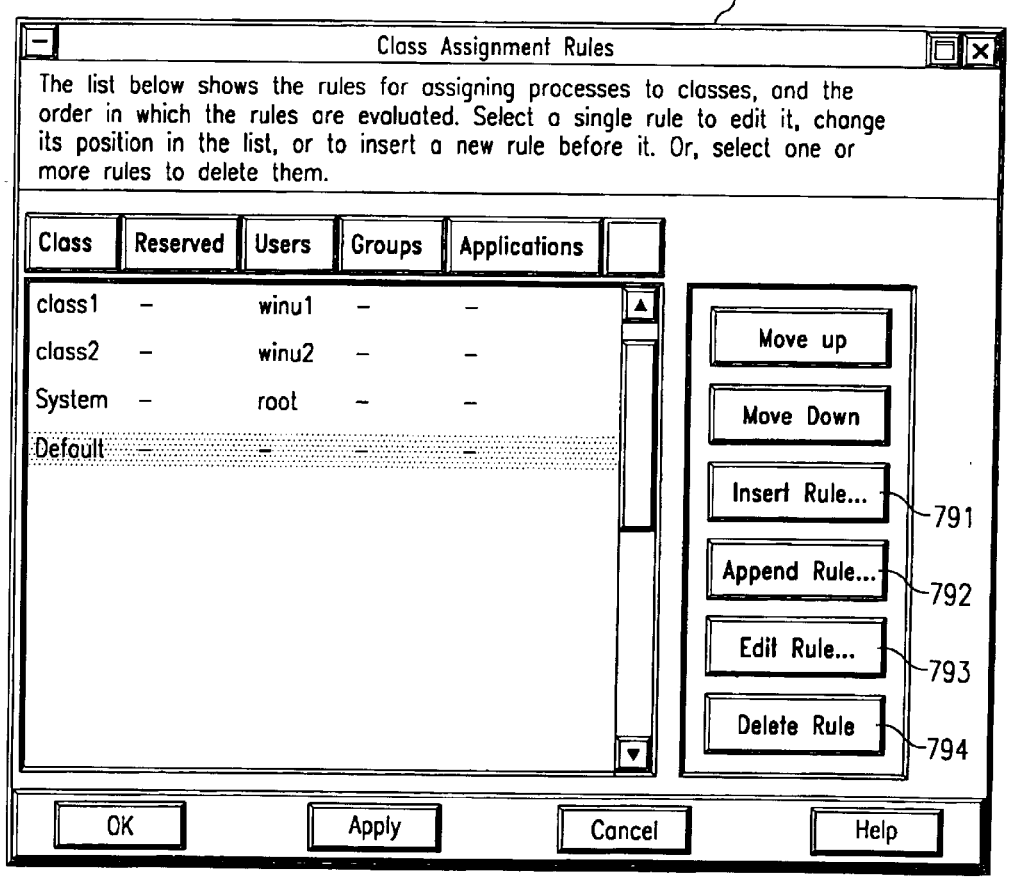
FIG. 7D is an exemplary diagram illustrating a "Class Assignment Rules" graphical user interface, in accordance with the present invention.

FIG. 7D illustrates a "Class Assignment Rules" graphical user interface. As shown in FIG. 7D, the "Class Assignment Rules" graphical user interface provides a listing 790 of the defined classes with fields for designating the attribute values that make up the class assignment rules. Rules may be inserted, appended, edited, or deleted using the virtual buttons 791–794. Additional graphical user interfaces may be provided based on the selection of the virtual buttons 791–794 to facilitate the inserting, appending, editing or deleting of class assignment rules.

Figure 7E:
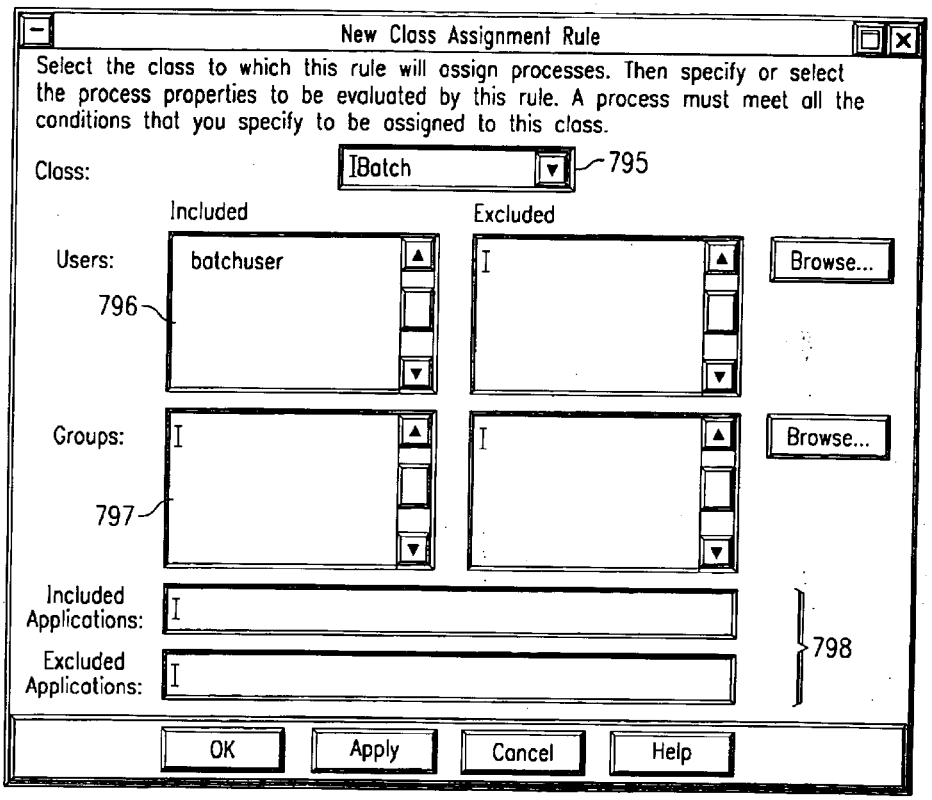
FIG. 7E is an exemplary diagram illustrating a graphical user interface for inserting a new class assignment rule, in accordance with the present invention.

For example, FIG. 7E illustrates a graphical user interface for inserting a new class assignment rule. As shown in FIG. 7E, the graphical user interface includes a field 795 for entering a class name and fields 796–798 for entering process attribute values to be included or excluded as part of the class assignment rule.

The graphical user interfaces depicted in FIGS. 7A–7E are only intended to be exemplary and are not intended to limit the invention to the particular interfaces shown. The present invention may be implemented using any mechanism for inputting class definitions and class assignment rules, including non-graphical user interfaces. The present invention may use the graphical user interfaces depicted in FIGS. 7A–7E as well as other graphical user interfaces in addition to or in place of those depicted.

Workload Management Within a Tier

The number of shares of a system resource for a class determines the proportion of a system resource that should be allocated to the processes assigned to the class. Thus, the system resource shares specify relative amounts of usage between different classes in the same tier.

A class is active if it has at least one process assigned to it. System resources are only allocated to a class with assigned processes. Thus, system resource percentages are calculated based on the total number of shares held by active classes. As a result, if additional classes become active, i.e. a process is assigned to the class, or classes become inactive, the system resource percentages will be recalculated based on the new number of shares.

The percentage of a system resource that should be provided to each class, hereafter referred to as the percentage goal, is calculated as the number of shares allocated to that class divided by the total number of shares allocated to the active classes in the same tier. Thus, for example, if a class has 6 shares and there are 10 total shares within the active classes of its tier, the class percentage goal is 60% of the system resource.

FIG. 8 illustrates the percentage goals of a system resource for a plurality of classes based on shares both before and after an addition of an active class. As shown in FIG. 8, three active classes having 5, 7 and 2 shares, respectively, are requesting access to system resources. As a result, the first class having 5 shares has a percentage goal of 35.7%, the second class with 7 shares has a percentage goal of 50%, and the third class with 2 shares has a percentage goal of 14.3%. After a new active class is added with 3 shares, the percentage goals are adjusted such that the first class' percentage goal is now 29.4%, the second class' percentage goal is 41.2%, the third class' percentage goal is 11.8%, and the newly added class' percentage goal is 17.6%.

The actual allocation of the system resource to a process is based on a resource allocation priority associated with the process. With respect to some system resources, all processes in the same class may have their priorities set to the same amount. Alternatively, each individual process may have a priority component that will also be included in the calculation of its resource allocation priority. This enables the present invention to, for example, adjust the class' contribution to dispatching priority to simultaneously benefit (or degrade) the overall access of the class' processes to the system resource. In addition, the present invention may also prioritize based on the individual process' current system resource utilization, which enables the present invention to favor the more interactive processes in the class with respect to the more compute-intensive ones.

However, the resource allocation priority range allowed to processes in one class may be different from those of processes in other classes in the tier. The resource allocation priority range is adjusted based on a comparison of the actual amount of the system resource being utilized by a class to the class' assigned resource limits and percentage goal.

As mentioned above, each class has assigned system resource limits designating the minimum and maximum percentages of system resources that are to be allocated to the class. If a calculated percentage based on shares and total number of shares of active classes indicates that the calculated percentage is below the minimum resource limit, the class will be favored for additional usage of the system resource. That is, the processes in the class will be given higher resource allocation priorities.

Similarly, if the calculated percentage is above the maximum resource limit, the class will not be favored for additional usage of the system resource. That is, lower resource allocation priorities are given to processes in classes that are getting more than their maximum resource limit. This makes it more likely that the classes using less than their minimum resource limit will be given access to the system resource if they try to use it and classes using more than their maximum resource limit will be less likely to be given access to the system resource.

Resource limit values for each of the classes are stored in the share/tier profile storage device 430. The resource limits are specified as a minimum to maximum range. Class resource limits are governed by the following rules: (1) resource limits take precedence over class share values; (2) the minimum limit must be less than or equal to the maximum limit; and (3) the sum of all minimum limits for a resource for classes in the same tier cannot exceed 100 percent.

Thus, the three values of minimum resource limit, percentage goal (calculated from the relative shares of active classes), and maximum limit for each class are used to manage the workload of each class. The goal is to, on average, maintain the allocation of the system resource between the minimum limit and the percentage goal.

Every predetermined time increment during the operation of the data processing system, the percentage goal for each active class is determined. The percentage goal, as described above, is calculated by dividing the number of shares allocated to the class by the total number of shares for active classes in the tier.

In addition, the actual usage of each process in each class is determined in a manner generally known in the art. These usage values are summed over the class to get the total class utilization. For example, if the system resource being utilized is the central processing unit (CPU), this summing is done incrementally, i.e. as a unit of CPU time is accounted to a process, it is simultaneously accounted to the class containing the process.

This actual usage is compared to the minimum resource limit, maximum resource limit and the percentage goal for the active classes to determine which processes should be favored and which processes should be penalized. The favoring or penalizing of processes is performed by adjusting the resource allocation priority of all the processes in the class using a value or values associated with the class.

The processor resource allocation priority is calculated based on the following factors: standard thread priority, recent utilization history of the thread, process NICE value, tier priority adjustment and class priority adjustment. The standard thread dispatching priority is an arbitrary value somewhere in the middle of a range of dispatching priorities. This means that a "standard" thread starts off at a disadvantage compared to a non-standard (privileged, system, etc.) thread, which does not have a penalty of the same size. For example, with dispatching priorities, 0 is the highest priority. Thus, starting the standard thread from a dispatching priority of 60 leaves room for system threads to get superior service.

Many system threads run with fixed priorities better than 40 meaning they do not get penalized for using the system resource at all. Others take advantage of the NICE command, described hereafter, to start their priorities from values better than 60 (these values can be no better than 40, however). Thus, a NICEd thread can use a substantial amount of a system resource before its priority gets down to 60, which is an advantage. NICE, along with fixed priority, can also be used to disadvantage a thread.

The process NICE value is an additional factor that can be set manually, and is a standard UNIX dispatching priority mechanism. An ordinary user can "nice" his less important (background) work in order to benefit system performance as a whole, and his own more important work in particular. By doing so, he requests degraded service for that background work. Some shells do this automatically to background work. A privileged user can use NICE to improve the service to selected processes. The NICE value is applied to a process, and reflects down into the priority calculation of the threads in that process in much the same way that the class priority adjustment reflects down into the priority calculation as described above.

The tier priority adjustment is a value derived based on the relative priorities of the tiers. For example, in one exemplary embodiment, the tier priority adjustment may be a static value set to four times the tier value. Of course, any value derived based on the relative priorities of the tiers may be used without departing from the spirit and scope of the present invention. Alternatively, the tier priority adjustment may be an enforced range in which the priorities of the processes in the classes of the tier are allowed to fall.

As mentioned above, each class may have limits associated with the class for identifying the minimum amount of system resources to be allocated to the processes in the class and a maximum limit on the amount of system resources allocated to the class. The limits may not be hard limits, i.e. if system resource allocation is above the maximum limit the allocation is not necessarily reduced to the maximum and if the system resource allocation falls below the minimum limit the allocation is not necessarily raised to the minimum.

Rather, the limits defined for the classes may be viewed as "soft" limits which define thresholds between which classes are either favored, not favored, or neutral. For example, if system resource allocation for a class falls below the minimum limit, the class will be favored for the allocation of additional system resources. Similarly, if system resource allocation for a class is above a maximum limit, the class will not be favored for additional system resource allocation. Thus, a class may have system resource allocation that is below the minimum limit or above the maximum limit.

In addition, each class may have a defined absolute maximum limit. This absolute maximum limit is a hard limit. That is, if system resource allocation reaches the absolute maximum limit, additional system resource allocation for that class is cut off.

The class priority adjustment is determined based on a value, hereafter referred to as delta, which is computed for every predetermined time increment. The delta value is essentially the difference between the average system resource usage over a specified time interval and the system resource usage for the last predetermined time increment. Thus, for example, delta may be the difference between the average system resource usage for the last five seconds and the system resource usage for the previous second.

Figure 9:
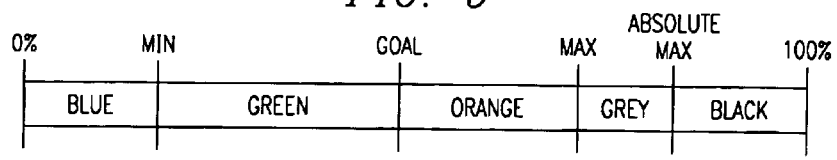
FIG. 9 is a diagram that illustrates the five zones defined for a class system resource usage.

The class priority adjustment depends on the system resource usage compared to the minimum resource limit, maximum resource limit, absolute maximum resource limit and percentage goal. Five zones are defined for the class system resource usage as shown in FIG. 9. As shown in FIG. 9, the five zones comprise the black zone which is between the absolute maximum resource limit and 100% system resource usage; the grey zone which is between the absolute maximum resource limit and the "soft" maximum limit; the orange zone which is between the calculated percentage goal and the maximum resource limit; the green zone which is between the minimum resource limit and the calculated percentage goal; and the blue zone which is between the minimum resource limit and 0% system resource usage.

If the actual system resource usage falls in the black zone, the class priority adjustment is set to a value which blocks the process from obtaining access to system resources. If the actual system resource usage falls in the grey zone, the class priority adjustment is set to disfavor the process from obtaining access to system resources at the expense of the other classes in its tier. If the actual system resource usage falls in the orange zone and the delta is less than or equal to zero, the class priority adjustment is not changed. This is because system resource usage is decreasing.

If the actual system resource usage falls in the orange zone and the delta is greater than zero, the class priority adjustment is incremented by a multiple of the delta value. For example, the class priority adjustment is incremented by 1.5 times the delta value. This is because system resource usage is increasing.

If the actual system resource usage falls in either the green or the blue zone and delta is greater than zero, the class priority adjustment is not changed. This is because system resource usage is increasing. However, if the actual system resource usage falls in either the green or the blue zone and delta is less than or equal to zero, the class priority adjustment is decremented by a multiple of the delta value. For example, the class priority adjustment may be decremented by 1.5 times the delta value. This is because the class is favored for additional system resource usage.

Workload Management Between Tiers

As described above, an additional mechanism utilized for performing workload management is having multiple tiers of classes. Each defined class is assigned to a particular tier. The tier represents a relative importance of a group of classes to other groups of classes. Thus, classes in tier 0 are considered to be of higher importance than classes in tiers 1–9.

With the present invention, processes in classes assigned to tier 0 are provided system resources before processes in classes assigned to tiers 1–9. As a result, processes in classes assigned to tiers 1–9 may experience system resource starvation.

Classes in tier 0 are provided as much of the system resources that they require in accordance with their relative shares. Thus, the only mechanism by which processes in classes in lower tiers are able to obtain access to system resources is if the classes in the higher tiers do not use all of the system resources, i.e. there are spare system resources, or if the classes in the higher tier have reached their absolute maximum for system resource allocation. If either of these conditions occur, the extra or spare system resources are then allocated to classes in the lower tier in the same manner. In this way, system resource allocation trickles down from tier to tier.

Thus, for example, if there are processes in tiers 0–1, the aggregate of the active classes in tier 0 will be provided with as much of the system resource as they can collectively obtain. If a first class in tier 0 reaches the absolute maximum limit, the other classes in tier 0 will be more favored for system resource allocation. If all of the classes in tier 0 reach their absolute maximum limit, the excess system resource trickles down to the next tier and is allocated to classes in accordance with the relative shares of the classes in the tier. This continues until 100% utilization of the system resource is reached. All classes falling after those included in the 100% utilization of the system resource must wait until some of the system resource is freed-up for them to be allocated a portion of the system resource.

Similarly, if the classes in tier 0 do not reach their absolute maximum limit, but rather do not require all of the system resource utilization, the spare system resources will trickle down to lower tiers. This occurs in substantially the same manner as described above. Thus, lower tier processes are only provided access to system resources when there is extra system resource utilization available after the processes in higher tiers have been given as much as they require, or are permitted according to any absolute maximums specified.

Overcommitment of system resources may occur through the usage of multiple tiers. The sum of all minimum limit values for active classes in a single tier is required to be less than 100%. However, it may happen that the sum of the minimum limit values of active classes that belong to different tiers is more than 100% of the system resource.

It is possible to identify at which tier the sum of minimum resource limits exceeds 100% by summing the minimum resource limit values of active classes starting from the most important tier (tier 0). The classes in that tier and higher numbered tiers, i.e. less important tiers, are considered to be in the orange range regardless of their actual system resource usage. This is done to prevent overcommitment of the system resource and make sure that the active classes in the lower numbered tiers, i.e. the more important tiers, can have at least their minimum system resource requirements satisfied.

It is important to classify the processes in the lower level tiers in the orange region, so that they can consume resources should there be spare system resources. This allows the capacity of Input/Output (IO) devices, which are not known a priori, as is the case with CPUs, to be dynamically measured. The capacity of IO devices may be measured by the number of requests that can be serviced in a given interval. A rolling average may be used to determine the reasonable capacity of an IO device.

The present invention uses a combination of the workload management between tiers and the workload management of classes within tiers described above. Thus, with the present invention, system resources are allocated to processes based on their relative importance to other processes in different tiers and to different lasses within the same tier.

FIG. 10 is a flowchart outlining an exemplary operation of the present invention when performing workload management between classes within different tiers. As shown in FIG. 10, the operation starts with receiving processes for execution using a system resource (step 1010). For the next tier in the hierarchy of tiers (which in the first time through the loop, is the highest priority tier, e.g., tier 0), class assignments of processes assigned to this tier are determined (step 1020). Processes in this tier are allocated system resource utilization based on their requirements, minimum and maximum limits, the absolute maximums associated with the classes in the tier, and the resources available to the tier (step 1030). As described above, classes in lower priority tiers are not provided system resources unless either the absolute maximums of all classes in higher tiers are reached or there is otherwise some excess system resources. These lower priority classes are still allocated system resources, although the system resource may or may not actually be provided to these classes.

A determination is made as to whether there are any additional tiers that need to be processed (step 1040). If there are additional tiers in the hierarchy that have not already been processed, the operation returns to step 1020. If there are not any additional tiers, the operation ends.

FIG. 11 is a flowchart outlining an exemplary operation of the present invention when performing workload management between classes in the same tier. The operation described in FIG. 11 may be included as step 1030 in FIG. 10.

As shown in FIG. 11, the operation starts with receiving processes for execution using a system resource (step 1110). The assigned classes of the processes are determined (step 1120). Each class is guaranteed their minimum limit of the system resource if the processes in the class require it (step 1130). Thereafter, the system resource allocation is made based on relative shares of the classes and their class priority (step 1140).

Based on the actual system resource utilization and the assigned limits to the classes, the class priority adjustments are determined (step 1150). If a class system resource utilization is below the minimum limit, the class priority adjustment is set so as to strongly favor the class. If a class reaches its defined maximum limit, the class priority adjustment is set so as to strongly disfavor the class. Otherwise, the priority is adjusted gently as necessary to cause utilization to tend towards the goal. If a class system resource utilization reaches the absolute maximum, the class is not allowed to receive additional system resource utilization. The operation repeats steps 1110–1150 until no processes are received (step 1160). This operation is performed for each tier, wherein the system resource for lower tiers is the amount of a system resource not allocated to higher tiers.

Thus, the present invention provides a mechanism for assuring that higher priority processes are provided greater amounts of system resource utilization than lower priority processes. The mechanism of the present invention utilizes shares and tiers to organize classes of processes into groups of processes having various levels of priority. The mechanism of the present invention allows the highest priority processes to obtain as much of a system resource as the processes need, within an absolute maximum limit, and allows additional system resources to trickle down to processes in lower tiers. In this way, the present invention provides an apparatus and method that manages workloads of a computing system such that the workloads are provided system resources in a manner consistent with the importance of the workload relative to other workloads.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of workload management in a data processing system, comprising:
   classifying a process into a class of a plurality of predefined classes, each of the plurality of predefined classes having corresponding system resource shares and a tier;
   performing workload management with respect to classes in other tiers based on priorities of the tiers; and
   performing workload management with respect to other classes within a same tier as the class into which the process is classified, based on the corresponding system resource shares of the class and of the other classes, such that at least some of the processes within a same tier concurrently share system resources during execution of the at least some processes, wherein performing workload management with respect to other classes within a same tier comprises determining a percentage goal for the process as a function of a number of system resource shares associated with the class in which the process is classified divided by a total number of shares allocated to active classes in the same tier as the class in which the process is classified.

2. The method of claim 1, wherein if the percentage goal is below a minimum resource usage limit, the class is favored for additional usage of the system resource, and wherein if the calculated percentage goal is above a maximum resource usage limit, the class is not favored for additional usage of the system resource.

3. The method of claim 2, wherein the minimum resource usage limit and maximum resource usage limit are retrieved from a share/tier profile storage.

4. A method of workload management in a data processing system, comprising:
   classifying a process into a class of a plurality of predefined classes, each of the plurality of predefined classes having corresponding system resource shares and a tier;
   performing workload management with respect to classes in other tiers based on priorities of the tiers;
   performing workload management with respect to other classes within a same tier as the class into which the process is classified, based on the corresponding system resource shares of the class and of the other classes, such that at least some of the processes within a same tier concurrently share system resources during execution of the at least some processes, wherein performing workload management with respect to other classes within the same tier comprises determining a resource allocation priority range for the class based on a minimum resource usage limit, a maximum resource usage limit, and a resource usage goal; and
   adjusting a priority of the class by a class priority adjustment value, the class priority adjustment value being determined based on a comparison of actual resource usage to the minimum resource usage limit, the maximum resource usage limit, and a resource usage goal, wherein if the actual resource usage is between the maximum resource usage limit and an absolute maximum resource usage limit, the class priority adjustment is set to disfavor the class from being allocated additional amounts of the resource.

5. A method of workload management in a data processing system, comprising:
   classifying a process into a class of a plurality of predefined classes, each of the plurality of predefined classes having corresponding system resource shares and a tier;
   performing workload management with respect to classes in other tiers based on priorities of the tiers;
   performing workload management with respect to other classes within a same tier as the class into which the process is classified, based on the corresponding system resource shares of the class and of the other classes, such that at least some of the processes within a same tier concurrently share system resources during execution of the at least some processes, wherein performing workload management with respect to other classes within the same tier comprises determining a resource allocation priority range for the class based on a minimum resource usage limit, a maximum resource usage limit, and a resource usage goal; and
   adjusting a priority of the class by a class priority adjustment value, the class priority adjustment value being determined based on a comparison of actual resource usage to the minimum resource usage limit, the maximum resource usage limit, and a resource usage goal, wherein if the actual resource usage is between the resource usage goal and the maximum resource usage limit and a difference between an average resource usage over a specified time interval and a resource usage for a last predetermined time increment is less than zero, the class priority adjustment is not changed.

6. A method of workload management in a data processing system, comprising:

classifying a process into a class of a plurality of predefined classes, each of the plurality of predefined classes having corresponding system resource shares and a tier;

performing workload management with respect to classes in other tiers based on priorities of the tiers;

performing workload management with respect to other classes within a same tier as the class into which the process is classified, based on the corresponding system resource shares of the class and of the other classes, such that at least some of the processes within a same tier concurrently share system resources during execution of the at least some processes, wherein performing workload management with respect to other classes within the same tier comprises determining a resource allocation priority range for the class based on a minimum resource usage limit, a maximum resource usage limit, and a resource usage goal; and adjusting a priority of the class by a class priority adjustment value, the class priority adjustment value being determined based on a comparison of actual resource usage to the minimum resource usage limit, the maximum resource usage limit, and a resource usage goal, wherein if the actual resource usage is between the minimum resource usage limit and the resource usage goal and a difference between an average resource usage over a specified time interval and a resource usage for a last predetermined time increment is greater than zero, the class priority adjustment is incremented by a function of the difference.

7. A method of workload management in a data processing system, comprising:

classifying a process into a class of a plurality of predefined classes, each of the plurality of predefined classes having corresponding system resource shares and a tier;

performing workload management with respect to classes in other tiers based on priorities of the tiers;

performing workload management with respect to other classes within a same tier as the class into which the process is classified, based on the corresponding system resource shares of the class and of the other classes, such that at least some of the processes within a same tier concurrently share system resources during execution of the at least some processes, wherein performing workload management with respect to other classes within the same tier comprises determining a resource allocation priority range for the class based on a minimum resource usage limit, a maximum resource usage limit, and a resource usage goal; and adjusting a priority of the class by a class priority adjustment value, the class priority adjustment value being determined based on a comparison of actual resource usage to the minimum resource usage limit, the maximum resource usage limit, and a resource usage goal, wherein if the actual resource usage is below the resource usage goal and the difference between an average resource usage over a specified time interval and a resource usage for a last predetermined time increment is greater than zero, the class priority adjustment is not changed.

8. A method of workload management in a data processing system, comprising:

classifying a process into a class of a plurality of predefined classes, each of the plurality of predefined classes having corresponding system resource shares and a tier;

performing workload management with respect to classes in other tiers based on priorities of the tiers;

performing workload management with respect to other classes within a same tier as the class into which the process is classified, based on the corresponding system resource shares of the class and of the other classes, such that at least some of the processes within a same tier concurrently share system resources during execution of the at least some processes, wherein performing workload management with respect to other classes within the same tier comprises determining a resource allocation priority range for the class based on a minimum resource usage limit, a maximum resource usage limit, and a resource usage goal; and adjusting a priority of the class by a class priority adjustment value, the class priority adjustment value being determined based on a comparison of actual resource usage to the minimum resource usage limit, the maximum resource usage limit, and a resource usage goal, wherein if the actual resource usage is below the resource usage goal and the difference between an average resource usage over a specified time interval and a resource usage for a last predetermined time increment is less than or equal to zero, the class priority adjustment is decremented by a function of the difference.

9. A method of workload management in a data processing system, comprising:

classifying a process into a class of a plurality of predefined classes, each of the plurality of predefined classes having corresponding system resource shares and a tier;

performing workload management with respect to classes in other tiers based on priorities of the tiers, wherein the system resource tiers are organized hierarchically by priority; and performing workload management with respect to other classes within a same tier as the class into which the process is classified, based on the corresponding system resource shares of the class and of the other classes, such that at least some of the processes within a same tier concurrently share system resources during execution of the at least some processes, wherein processes in classes in lower priority tiers are only able to obtain access to a resource if processes in classes in higher priority tiers do not use all of the resource or if the processes in each of the classes in the higher priority tier have reached an absolute maximum resource usage limit.

10. A computer program product in a computer readable medium for workload management in a data processing system, comprising:

first instructions for classifying a process into a class of a plurality of predefined classes, each of the plurality of predefined classes having corresponding system resource shares and a tier;

second instructions for performing workload management with respect to classes in other tiers based on priorities of the tiers; and third instructions for performing workload management with respect to other classes within a same tier as the class into which the process is classified, based on the corresponding system resource shares of the class and of the other classes, such that at least some of the processes within a same tier concurrently share system resources during execution of the at least some processes, wherein the third instructions for performing workload management with respect to other classes within a same tier comprises instructions for determining a percentage goal for the process as a function of a number of system resource shares associated with the class in which the process is classified divided by a total number of shares allocated to active classes in the same tier as the class in which the process is classified.

11. The computer program product of claim 10, wherein if the percentage goal is below a minimum resource usage limit, the class is favored for additional usage of the system resource, and wherein if the calculated percentage goal is above a maximum resource usage limit, the class is not favored for additional usage of the system resource.

12. The computer program product of claim 11, wherein the minimum resource usage limit and maximum resource usage limit are retrieved from a share/tier profile storage.

13. A computer program product in a computer readable medium for workload management in a data processing system, comprising:

first instructions for classifying a process into a class of a plurality of predefined classes, each of the plurality of predefined classes having corresponding system resource shares and a tier;

second instructions for performing workload management with respect to classes in other tiers based on priorities of the tiers;

third instructions for performing workload management with respect to other classes within a same tier as the class into which the process is classified, based on the corresponding system resource shares of the class and of the other classes, such that at least some of the processes within a same tier concurrently share system resources during execution of the at least some processes, wherein the third instructions for performing workload management with respect to other classes within the same tier comprises instructions for determining a resource allocation priority range for the class based on a minimum resource usage limit, a maximum resource usage limit, and a resource usage goal; and fourth instructions for adjusting a priority of the class by a class priority adjustment value, the class priority adjustment value being determined based on a comparison of actual resource usage to the minimum resource usage limit, the maximum resource usage limit, and a resource usage goal, wherein if the actual resource usage is between the maximum resource usage limit and an absolute maximum resource usage limit, the class priority adjustment is set to disfavor the class from being allocated additional amounts of the resource.

14. A computer program product in a computer readable medium for workload management in a data processing system, comprising:

first instructions for classifying a process into a class of a plurality of predefined classes, each of the plurality of predefined classes having corresponding system resource shares and a tier;

second instructions for performing workload management with respect to classes in other tiers based on priorities of the tiers, wherein the system resource tiers are organized hierarchically by priority;

third instructions for performing workload management with respect to other classes within a same tier as the class into which the process is classified, based on the corresponding system resource shares of the class and of the other classes, such that at least some of the processes within a same tier concurrently share system resources during execution of the at least some processes, wherein processes in classes in lower priority tiers are only able to obtain access to a resource if processes in classes in higher priority tiers do not use all of the resource or if the processes in each of the classes in the higher priority tier have reached an absolute maximum resource usage limit.

* * * * *